(12) United States Patent
Holz

(10) Patent No.: US 11,497,367 B2
(45) Date of Patent: Nov. 15, 2022

(54) FLOOR PROCESSING DEVICE AND SYSTEM COMPRISED OF A FLOOR PROCESSING DEVICE AND AN EXTERNAL TERMINAL DEVICE

(71) Applicant: Vorwerk & Co. Interholding GmbH, Wuppertal (DE)

(72) Inventor: Christian Holz, Dortmund (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 261 days.

(21) Appl. No.: 16/815,203

(22) Filed: Mar. 11, 2020

(65) Prior Publication Data
US 2020/0288932 A1 Sep. 17, 2020

(30) Foreign Application Priority Data

Mar. 12, 2019 (DE) ..................... 10 2019 106 227.6

(51) Int. Cl.
*A47L 9/28* (2006.01)
*G06N 5/04* (2006.01)
(Continued)

(52) U.S. Cl.
CPC ............. *A47L 9/2826* (2013.01); *A47L 9/009* (2013.01); *A47L 9/2852* (2013.01); *A47L 9/2857* (2013.01); *A47L 9/2894* (2013.01); *A47L 11/282* (2013.01); *A47L 11/4011* (2013.01); *A47L 11/4066* (2013.01);
(Continued)

(58) Field of Classification Search
CPC ................ A47L 11/282; A47L 11/4011; A47L 11/4066; A47L 2201/04; A47L 2201/06; A47L 9/009; A47L 9/2826; A47L 9/2852; A47L 9/2857; A47L 9/2894; G05D 1/0219; G05D 1/0274; G05D 2201/0203; G05D 2201/0215; G06N 5/04
See application file for complete search history.

(56) References Cited

U.S. PATENT DOCUMENTS 10,398,269 B2 * 9/2019 Hillen .................... A47L 7/0004
10,609,862 B2 * 4/2020 Wu ......................... G06K 9/527
(Continued)

FOREIGN PATENT DOCUMENTS

EP 3 345 524 A1 7/2018
EP 3345524 A1 * 7/2018 ........... G05D 1/0274

*Primary Examiner* — Marc Carlson
(74) *Attorney, Agent, or Firm* — Collard & Roe, P.C.

(57) ABSTRACT

A floor processing device has a floor processing element, a detection device for detecting a surface parameter of the floor surface, and a data processing device. The data processing device has a data memory, which stores a recommended use belonging to a surface parameter of the floor surface for using a specific floor processing element. The data processing device retrieves the recommended use from the data memory and transmits it to a user via an interface. The data processing device compares the size of a first surface area that has a first surface parameter with the size of the remaining surface areas of the environment, which have a surface parameter that deviates from the first surface parameter, and retrieves the recommended use from the data memory corresponding to the surface parameter that corresponds to the largest surface portion from the entirety of the surface areas.

7 Claims, 1 Drawing Sheet

(51) Int. Cl.
*A47L 9/00* (2006.01)
*A47L 11/282* (2006.01)
*A47L 11/40* (2006.01)
*G05D 1/02* (2020.01)

(52) U.S. Cl.
CPC ............ *G05D 1/0219* (2013.01); *G06N 5/04* (2013.01); *A47L 2201/04* (2013.01); *A47L 2201/06* (2013.01); *G05D 2201/0203* (2013.01); *G05D 2201/0215* (2013.01)

(56) References Cited

U.S. PATENT DOCUMENTS

| | | | |
|---|---|---|---|
| 10,877,484 B2* | 12/2020 | Haegermarck | G06T 7/521 |
| 2007/0267570 A1* | 11/2007 | Park | G05D 1/0248 |
| | | | 250/221 |
| 2014/0166047 A1* | 6/2014 | Hillen | A47L 11/4061 |
| | | | 134/6 |
| 2014/0207280 A1* | 7/2014 | Duffley | A47L 9/2857 |
| | | | 700/257 |
| 2015/0327742 A1* | 11/2015 | Strang | G01N 21/251 |
| | | | 15/49.1 |
| 2018/0164213 A1* | 6/2018 | Windorfer | A47L 9/2805 |
| 2018/0360283 A1* | 12/2018 | Hackert | G05D 1/0297 |

* cited by examiner

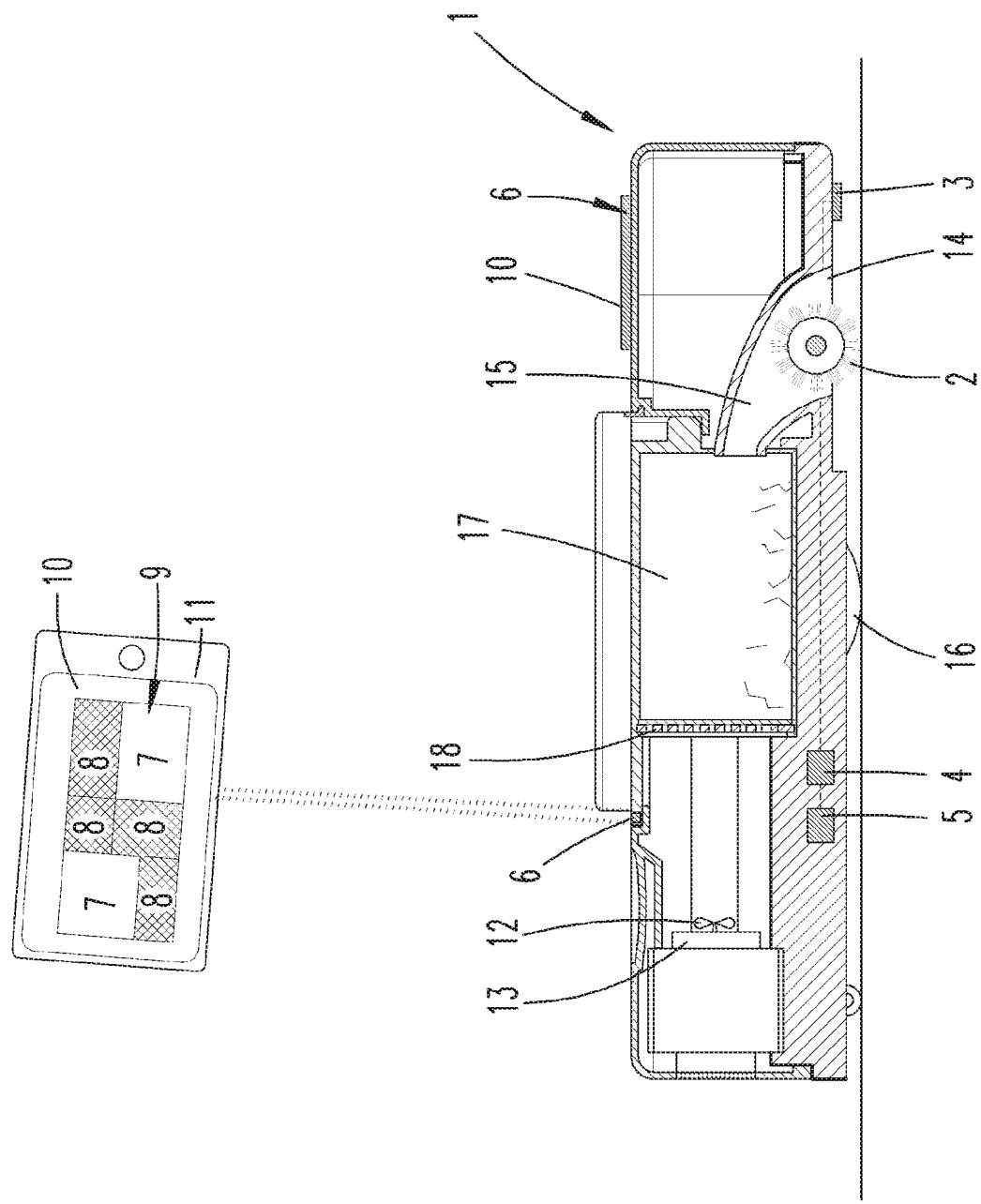

FLOOR PROCESSING DEVICE AND SYSTEM COMPRISED OF A FLOOR PROCESSING DEVICE AND AN EXTERNAL TERMINAL DEVICE

CROSS REFERENCE TO RELATED APPLICATIONS

Applicant claims priority under 35 U.S.C. § 119 of German Application No. 10 2019 106 227.6 filed on Mar. 12, 2019, the disclosure of which is incorporated by reference.

BACKGROUND OF THE INVENTION

1. Field of the Invention

The invention relates to a floor processing device with a floor processing element for acting on a floor surface, a detection device for detecting a surface parameter of the floor surface, and with a data processing device for determining the surface parameter based on the detection signals detected by the detection device, wherein the data processing device has allocated to it a data memory, which stores a recommended use belonging to a surface parameter of the floor surface for using a specific floor processing element, and wherein the data processing device is set up to retrieve the recommended use corresponding to the determined surface parameter from the data memory and transmit it to a user via an interface.

In addition, the invention relates to a system comprised of a floor processing device and an external terminal, wherein the floor processing device and the external terminal have corresponding interfaces for wireless data communication with each other.

2. Description of the Related Art

Floor processing devices of the aforementioned kind are sufficiently known in prior art. For example, these can be automatically moving floor processing devices or even devices that are manually guided over a surface to be processed by a user. Floor processing devices are intended to be devices that perform a floor processing operation, for example clean the floor, in particular by vacuuming and/or mopping, but also floor processing operations such as polishing, sanding, mowing, sweeping or the like.

In order to detect a surface parameter of the floor surface, the floor processing devices can use ultrasound measuring processes, optical measuring processes, tactile measuring processes, image processing, frictional resistance measurements, performance measurements or the like, for example. For example, the determined surface parameter of the floor surface can be the type of a floor surface, in particular a carpeted floor or a hard floor, which are usually processed using different floor processing elements.

Known for example from EP 3 345 524 A1 is an automatically moving floor processing device, which moves over a surface to be processed and processes the floor as a function of a surface parameter of the surface, wherein a device parameter of the floor processing device is varied to process the floor as a function of the surface parameter. The surface parameter is here determined and compared with reference surface parameters stored in a database, wherein a device parameter is selected that corresponds to a reference surface parameter which is the closest to the surface parameter. The selected device parameter can be output to a user of the floor processing device and/or automatically set on the floor processing device.

Even though the aforementioned floor processing devices already transmit a recommendation to the user for a device parameter to be used in an advantageous manner or set it directly on the floor processing device, processing an environment with very inhomogeneous surface properties can result in information being communicated to the user of the floor processing device especially often, which he or she might construe as bothersome.

SUMMARY OF THE INVENTION

Proceeding from the aforementioned prior art, it is thus the object of the invention to further develop a floor processing device in such a way that it performs as optimal a floor processing operation with minimal effort by the user, even in inhomogeneous environments.

In order to achieve the aforementioned object, it is proposed that the data processing device further be set up to compare the size of at least one first surface area that has a first surface parameter with the size of the remaining surface areas of the environment, which have a surface parameter that deviates from the first surface parameter, and retrieve the recommended use from the data memory corresponding to the surface parameter that corresponds to the largest surface portion from the entirety of the surface areas.

According to the invention, the data processing device of the floor processing device is now configured in such a way that the environment as a whole is analyzed in relation to all surface parameters represented therein, so as to then output a recommended use to a user of the floor processing device that enables the best possible processing of the environment as a whole. The recommended use here comprises a recommendation to the user that a specific floor processing element be used for the entire environment, so that the user might only have to replace or assemble the floor processing element on the floor processing device once for processing the environment. The entirety of the surface areas of the environment can here be defined by a user. This entirety preferably comprises surface areas with different surface parameters. In this sense, the environment can comprise all rooms in a home, but also just a partial area thereof, for example only a defined percentage of the rooms present in the home. However, the different surface areas of the environment can also be areas of just a single room which has a plurality of different surface parameters, for example a dirty living area of an animal and/or a human and a less used partial area, for example along the wall of a room. For example, the surface areas can differ in terms of the type and/or a quantity of dirt present there, and/or the type of a surface covering. In both cases, it is required or at least recommended for optimal floor processing that floor processing elements tailored thereto be used.

However, to avoid making the user have to exchange the floor processing element for each individual surface parameter change of an environment to be processed, the data processing device determines the floor processing element that delivers the best overall floor processing result for the entirety of the surface areas to be processed. This floor processing element is then used as a universal accessory, for example for the entire floor processing cycle in the defined environment. While the floor processing device can basically be equipped with a floor processing element that has very specific properties for only one of the surface areas of the environment, the surface parameters of the entire environment are averaged for a more comfortable use of the floor processing device, for example, so as to give a recommended use for one of the floor processing elements that is favorable in relation to the floor processing result. To this end, the data processing device independently determines which accessory is especially suitable for the working area to be currently processed from the detection signals of the detection device. If this accessory is already connected with the floor processing device, the data processing device preferably does not output any recommended use, but rather does so only if the recommendation involves using a floor processing element that is not yet secured to the floor processing device at that time. As a whole, for example, the data processing device determines the percentage overall surface portions of those surface areas with an identical surface parameter, and thereupon determines the surface parameter that is allocated to the largest overall surface portion, and retrieves a recommended use that fits this surface parameter from the data memory. For example, the data processing device uses the detection signals of the detection device to determine those portions of the environment that are covered by a carpeted floor, and those portions that have a hard floor. If the data processing device determines that 70 percent of the environment is covered by hard floor, for example wooden floorboards or tiles, and only a smaller portion of 30 percent by carpets or carpeted floors, the data processing device retrieves a recommended use that fits the "hard floor" surface parameter from the data memory, and transmits it to the user via the interface. However, the surface parameter can here also be refined even further, for example in relation to various compositions of carpets or carpeted floors, in particular high pile carpeting, low pile carpeting, carpets with fringes and the like. In the event that the environment predominantly has hard floors, the recommended use can give the user an indication to use a hard floor attachment. By contrast, if several runners or high pile carpets are present in the environment, the recommended use could propose a soft brush that does not displace the runners or carpets relative to a floor surface.

It is further proposed that the floor processing device have a navigation device, which is set up to generate an area map of the environment of the floor processing device, wherein the data processing device is set up to enter the surface parameters of the floor surface into the area map. Floor processing devices with a navigation device are usually automatically moving floor processing devices, for example cleaning robots, which automatically move within the environment and can localize their own position. The navigation device has allocated to it a sensor array, which detects the environment features in the environment, and generates a layout of the environment therefrom and determines objects located therein. For example, a distance measuring device can be allocated to the navigation device, which measures the distances to room boundaries and/or obstacles. For example, this can be a 360° distance measuring device, in particular a laser measuring device. For navigation purposes, the navigation device or an allocated data processing device generates the area map, which contains the features of the environment and based upon which path planning for the floor processing device can take place, for example. The area map can be generated within the framework of a learning run of the floor processing device, in which the floor processing device traverses the environment without performing a floor processing activity and measures objects. However, it is alternatively also possible that the area map be generated or at least expanded and/or updated during a floor processing activity. For example, within the framework of generating the area map, the detection device of the floor processing device can also detect the surface parameters of the floor surface of the environment, wherein the data processing device then allocates the detected surface parameters to the corresponding surface areas of the area map. This area map containing the surface parameters can likewise be transmitted or displayed to a user of the floor processing device via the interface. In order to be able to transmit a surface parameter that is prominently represented in the environment, the data processing device of the floor processing device can access the area map and calculate a quantitative relationship for the surface areas as a function of the surface parameters represented there. In like manner, a specific totality of surface areas can be defined based on the area map, which are to be processed in a working cycle, and for which a universally suitable floor processing element is to be used.

It is proposed that the interface have a display for showing the recommended use. The recommended use is thus shown to the user of the floor processing device on a display of the floor processing device. A recommendation can here be shown on the display as a text and/or an image.

Alternatively or additionally, it can likewise be provided that the interface have a data communication interface for wirelessly communicating with an external terminal, wherein the data processing device is set up to transmit the recommended use to the external terminal by means of the data communication interface and/or receive information about a processing preference of a user. According to this configuration, the recommended use can be displayed on an external terminal having a communications link with the floor processing device. To this end, for example, the floor processing device has a Bluetooth and/or WLAN interface, which allows wireless data communication with the external terminal. For example, the external terminal can be a mobile terminal such as a mobile phone, tablet computer or the like. The external terminal can then once again have a display on which the recommended use is shown. In the reverse communication direction, the interface of the floor processing device is set up to receive messages from the external terminal, here specifically information about a processing preference of a user that relates to the floor processing activity of the floor processing device. The data processing device of the floor processing device is then once again set up in such a way as to consider the processing preference of the user when determining the recommended use, and retrieve a recommended use from the data memory of the floor processing device, which corresponds to the determined surface parameter of the environment on the one hand, and also takes account of the processing preference of the user on the other.

In particular in this sense, it can be provided that the data processing device be set up to additionally select and/or vary the recommended use as a function of a processing preference of a user, wherein the processing preference is in particular a processing duration and/or a processing quality of the floor processing activity. This configuration allows an interaction with the user of the floor processing device via the external terminal. For example, the external terminal can have installed on it an application with which users can indicate their processing preference, for example whether their focus for the floor processing activity of the floor processing device is centered more on performing as intensive a floor processing operation as possible, for example cleaning with a maximum dust and/or dirt collection, or whether they are more interested in a shorter timeframe for performing the floor processing activity. In combination with the surface parameters determined by the detection device of the floor processing device, the selection of the floor processing element can then additionally also be adjusted to the wishes of the user. In order to adjust the recommended use to both the surface parameter and the processing preference, the data memory has the corresponding allocations to floor processing elements.

Finally, it is proposed that the floor processing element be a cleaning brush and/or a mopping element. For example, the floor processing device is a vacuum cleaner, a mopping device or even a vacuuming/mopping combination. Depending on the type of floor surface to be cleaned, for example a carpet, carpeted floor, cork, wooden floorboards, laminate, tiles, PVC or the like, other cleaning elements such as cleaning brushes and/or mopping elements are especially suitable for loosening any existing dirt from the floor surface.

Apart from the floor processing device described above, the invention also proposes a system comprised of a floor processing device of the inventive kind and an external terminal, wherein the floor processing device and the external terminal have corresponding interfaces for wireless data communication with each other, and wherein the data processing device of the floor processing device is set up to transmit a recommended use corresponding to a determined surface parameter of the floor surface to the external terminal via the interface and/or to receive information about a processing preference of a user via the interface.

The system here comprises a floor processing device according to the invention with one or several of the features and advantages described above. In particular, the floor processing device is also equipped with a data processing device within the framework of the system, which is set up to quantitatively determine a surface portion of a first surface area having a first surface parameter in relation to the remaining surface areas of the environment, which have a surface parameter deviating from the first surface parameter, and to retrieve the recommended use from the data memory corresponding to the surface parameter that is quantitatively represented the most in the totality of surface areas of the environment. The recommended use is transmitted by the floor processing device via the interface of the floor processing device to a corresponding interface of the external terminal, so that the external terminal can subsequently notify the user about the recommended use. For example, a recommended use can be shown on a display of the external terminal as a text and/or an image. The external terminal is further used to transmit a processing preference of the user to the data processing device of the floor processing device. In particular, the external terminal has an application that permits such a user input by the user. For example, a surface with various preferences can be shown to the user on a display by means of the application, one of which the user can select. The selectable preferences can include an intensive floor processing and/or an especially quick floor processing. The user can accept a suggestion by way of confirmation or alternatively transmit a preference to the external terminal in text form.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 1 is a floor processing device according to the invention as well as an external terminal with a communications link thereto.

DETAILED DESCRIPTION OF PREFERRED EMBODIMENTS

FIG. 1 shows an exemplary floor processing device 1, which here is designed as a vacuuming robot. For purposes of automatic navigation and self-localization, the floor processing device 1 has a distance measuring device (not shown in any more detail), with which distances to objects and room boundaries in the environment of the floor processing device 1 can be measured. An area map 9 is generated based on the measured distances, which is stored in a data memory 5 of the floor processing device 1. A data processing device 4 of the floor processing device 1 accesses the area map 9, so as to localize itself within the environment, and possibly to plan a traversing path for a floor processing activity. For example, the distance measuring device is here a triangulation measuring device with a light source, which directs a light beam toward objects and/or room boundaries in the environment, and receives a reflected light signal. The data processing device 4 can calculate a distance to the respective object or room boundary from that. The light beam emitted by the light source can be rotated around the floor processing device 1 in an angular range of 360 degrees, thereby enabling an all-round distance measurement.

The floor processing device 1 here also has driven wheels 16 and a vacuuming device with a fan 12 and an electric motor 13 that powers the fan 12. While a floor processing activity is being performed, the rotating fan 12 aspirates suction material into a filter chamber 17. To this end, the fan 12 generates a negative pressure in a suction channel 15 and on a suction mouth 14 of the floor processing device 1 lying close to the floor. The filter chamber 17 has allocated to it a filter element 18, so that the suction material is retained in the filter chamber 17, and only purified air can flow further through the filter 18 and to the fan 12 or electric motor 13. Also allocated to the suction mouth 14 is a floor processing element 2, here specifically a bristle roller that rotates around an essentially horizontal axis. The floor processing element 2 is replaceably secured to the floor processing device 1, so that a user of the floor processing device 1 can exchange the depicted floor processing element 2 for an alternative floor processing element 2.

Located on the bottom side of the floor processing device 1 is a detection device 3, which is set up to detect a surface parameter of the floor surface, here specifically the type of a floor covering of the surface to be cleaned. For example, the detection device 3 is a camera, the captured images of which can be analyzed by an image processing program of the data processing device 4, so as to determine the type of floor. It can additionally be provided that the detection device 3 or data processing device 4 also be suitable for determining the intensity and/or type of floor surface contamination. The floor processing device 1 here further has two interfaces 6, for example, via which information can be transmitted to a user or to an external terminal 11. For example, a first interface 6 has a display 10 for displaying information for the user. A second interface 6 is here a data communication interface, which is used for wireless communication with the external terminal 11. For example, this interface 6 can have a Bluetooth module, a WLAN module or the like.

The external terminal 11 here likewise has an interface (not shown in any more detail) for communicating with the floor processing device 1. In addition, the external terminal 11 has a display 10 for displaying information. The display 10 is preferably a touchscreen, which simultaneously serves as an input device for the user. The external terminal 11 has installed on it an application, with which information can be shown to the user on the display 10, and into which processing preferences can be entered, for example, so as to influence the floor processing activity of the floor processing device 1. On FIG. 1, the display 10 of the external terminal 11 shows an area map 9 generated by the floor processing device 1, which illustrates a layout of the environment of the floor processing device 1, here for example the layout of a home in which the floor processing device 1 is located. The area map 9 shows various floor surfaces 7, 8, which have differing surface parameters.

One possible embodiment of the invention functions in such a way that the floor processing device 1 moves around in the environment, and in so doing captures images of a surface to be cleaned by means of its detection device 3. For example, the floor processing device 1 here traverses all rooms in the home to be cleaned within the framework of a learning run, and generates the area map 9 by means of the data processing device 4. The area map 9 is stored in the data memory 5 of the floor processing device 1. In addition, the data memory 5 has stored allocations between floor processing elements 2 that can be connected with the floor processing device 1 and various floor surface types. For example, the floor processing elements 2 can be different suction nozzles and/or cleaning brushes for hard floors or different types of carpeted floors or carpets, for example in particular soft brushes for easily displaceable runners or high-pile carpets or stronger cleaning brushes for low-pile carpeted floors. By image processing the images of the detection device 3, the data processing device 4 determines the floor types of the floor areas 7, 8 present in the environment, and enters them into the area map 9. The area map 9 generated in this way can be transmitted to the external terminal 11 via the data communication interface 6, so that the area map 9 can be shown on the display 10 of the external terminal 11.

In order to now provide the user with an indication of what floor processing element 2 is especially suitable for the environment of the floor processing device 1, for example here specifically a certain cleaning brush, the data processing device 4 analyzes the surface areas 7, 8 (or a partial quantity thereof) stored in the area map 9 in relation to one or several surface parameters of the floor surface, here for example the floor type. In so doing, the data processing device 4 determines which floor type in the entirety of all selected floor areas 7, 8, for example in the entire environment recorded on the area map 9, arises most frequently, i.e., which surface type covers the largest surface portion of the environment. According to the area map 9 shown here, this is the floor type of the surface areas 8, here for example a hard floor. The data processing device 4 thereupon accesses the data memory 5 and retrieves a recommended use from the data stored therein for using a floor processing element 2 that is especially suited for a hard floor. The recommended use is transmitted by the data processing device 4 to the external terminal 11, for example via the interface 6, and/or shown on the separate display 10 of the floor processing device 1.

In another embodiment, it is possible for the user to transmit a processing preference to the data processing device 4 of the floor processing device 1 via the external terminal 11. This processing preference can contain information about the fact that the user is more interested in having the pending floor processing activity of the floor processing device 1 involve a very intensive cleaning of the environment, or instead a quick cleaning process. For example, the application installed on the external terminal 11 can provide the user with a selection menu for transmitting the processing preference. The data processing device 4 receives the processing preference of the user, and selects a recommendation for a floor processing element 2 from the data memory 5, which now corresponds to both the surface parameter of the quantitatively predominant surface areas 8 of the environment and to the processing preference of the user.

Although only a few embodiments of the present invention have been shown and described, it is to be understood that many changes and modifications may be made thereunto without departing from the spirit and scope of the invention.

REFERENCE LIST

1 Floor processing device
2 Floor processing element
3 Detection device
4 Data processing device
5 Data memory
6 Interface
7 Surface area
8 Surface area
9 Area map
10 Display
11 External terminal
12 Fan
13 Electric motor
14 Suction mouth
15 Suction channel
16 Wheel
17 Filter chamber
18 Filter element

What is claimed is:

1. A floor processing device comprising:
a floor processing element configured for acting on a floor surface,
a detection device in the form of a camera arranged on the floor processing device and being configured for detecting a surface parameter of the floor surface by capturing an image of the floor surface, and
a data processing device configured for determining the surface parameter based on the image captured by the detection device, and
a navigation device having a sensor array configured for detecting environment features in the environment, and generate an area map of an environment of the floor processing device,
wherein the data processing device has a data memory, which stores a recommended use belonging to the detected surface parameter of the floor surface for using a specific floor processing element, wherein the data processing device is set up to retrieve the recommended use corresponding to the detected surface parameter from the data memory and transmit the recommended use to a user via an interface, wherein the data processing device is further set up to compare a size of at least one first surface area that has a first surface parameter with a size of remaining surface areas of the environment, which have a surface parameter that deviates from the first surface parameter, and retrieve the recommended use from the data memory corresponding to the surface parameter that corresponds to a largest surface portion from the entirety of the surface areas, wherein the data processing device is configured to enter the detected surface parameters of the floor surface into the area map, wherein the data processing device is configured to access the area map and calculate a quantitative relationship for the surface areas as a function of the displayed surface parameters to determine the percentage of overall surface portions of those surface areas with an identical surface parameter, and thereupon determine the surface parameter that tis allocated to the largest overall surface portion, and retrieve a recommended use that fits the surface parameter from the data memory, and wherein the floor processing device is configured to act on a whole of the floor surface including the first surface area and the remaining surface areas according to the same recommended use corresponding to the largest surface portion.

2. The floor processing device according to claim 1, wherein the interface has a display for showing the recommended use.

3. The floor processing device according to claim 1, wherein the interface has a data communication interface configured for wirelessly communicating with an external terminal, wherein the data processing device is set up to transmit the recommended use to the external terminal by means of the data communication interface or receive information about a processing preference of a user.

4. The floor processing device according to claim 1, wherein the data processing device is set up to additionally select or vary the recommended use as a function of a processing preference of a user, wherein the processing preference is a processing duration or a processing quality of a floor processing activity.

5. The floor processing device according to claim 1, wherein the surface parameter of the floor surface is a type of floor surface.

6. The floor processing device according to claim 1, wherein the floor processing element is a cleaning brush or a mopping element.

7. A system comprised of the floor processing device according to claim 1 and an external terminal, wherein the floor processing device and the external terminal have corresponding interfaces for wireless data communication with each other, and wherein the data processing device of the floor processing device is set up to transmit a recommended use corresponding to a determined surface parameter of the floor surface to the external terminal via the interface or to receive information about a processing preference of a user via the interface.

* * * * *